UNITED STATES PATENT OFFICE.

AUGUSTUS BISCHLER, OF BASLE, SWITZERLAND, ASSIGNOR TO BASLE CHEMICAL WORKS, OF SAME PLACE.

IODOCHLOROXYQUINOLIN.

SPECIFICATION forming part of Letters Patent No. 641,491, dated January 16, 1900.

Application filed September 7, 1899. Serial No. 729,733. (Specimens.)

*To all whom it may concern:*

Be it known that I, AUGUSTUS BISCHLER, chemist and doctor of philosophy, a subject of the Emperor of Russia, residing at Basle, Switzerland, have invented a new and useful Product for Use in Medicine and Pharmacy, (Iodochloroxyquinolin;) and I hereby declare the following to be a clear and exact description of my invention.

I have found that by treating an aqueous solution of an alkaline salt of the chlor-(5)-oxy-(8)-quinolin with potassium iodid and hypochlorites or by iodizing the same in other ways a new compound (iodochloroxyquinolin) will be obtained, which may be employed as a substitute of iodoform not only in the treatment of wounds, but also for the chirurgical tuberculosis.

This new product may be obtained in the following way: Eighteen kilograms chlor-(5)-oxy-(8)-quinolin will be dissolved by boiling in six kilograms of caustic potash and four hundred liters of water and mixed with fifty liters of an aqueous solution of 16.6 kilograms of potassium iodid. The solution, still hot, will be filtered in case of existing impurities and cooled to the usual temperature. The yellow-colored clear fluid will then be mixed under stirring with one hundred and forty-two liters of a dilution of chlorid of lime containing five per cent. of active chlorin, at which under a slight increasing of temperature a thin yellow paste will be precipitated. To this paste must be added one hundred and fifty kilograms of hydrochloric acid of five per cent. by means of stirring slowly, and then the mixture is left to itself during twenty-four hours. The iodin which is separated through adding of hydrochloric acid has after this time usually disappeared. The yellow-brown colored voluminous precipitate is filtered and well washed with water. If the product shows free iodin, the mass is ground with a solution of potassium thiosulfate and filtered. Finally the substance is heated to 50° centigrade for a short time with fifty kilograms hydrochloric acid of one per cent. and then filtered. This treatment with hydrochloric acid is repeated until the remaining product, washed with water, melts, after being dried, at 170° to 175° centigrade. In this way the last traces of unchanged chloroxyquinolin are removed.

The thus-produced iodochloroxyquinolin is a grey-yellow voluminous powder, which is scentless and tasteless. It is fast to light and changes neither in damp air nor by heating for several hours over 100° centigrade. If boiled with diluted hydrochloric acid, it dissolves slowly with a scent of iodin. If heated with concentrated sulfuric acid, large quantities of iodin are developed.

The iodochloroxyquinolin is only partly soluble in water, very difficult to dissolve in hot alcohol, and more easily soluble in hot glacial acetic acid. Through repeated crystallizing from glacial acetic acid yellow-brown needles are obtained, which melt by 178° to 180° centigrade.

The new iodochloroxyquinolin finds in the medicine the same use as iodoform.

Having now described my invention, what I claim is—

As a new article of manufacture, the described iodochlor-(5)-oxy-(8)-quinolin, which is applicable in medicine and pharmacy as a substitute of iodoform, and constitutes in dry state a greyish-yellow, scentless powder, almost insoluble in water, very difficult to dissolve in alcohol and more easily soluble in hot glacial acetic acid, from which it crystallizes as yellow-brown small needles, which melt by 178° to 180° centigrade.

In witness whereof I have hereunto signed my name, this 29th day of August, 1899, in the presence of two subscribing witnesses.

AUGUSTUS BISCHLER.

Witnesses:
GEORGE GIFFORD,
AMAND RITTER.